(12) United States Patent
Ganchev (10) Patent No.: US 9,751,401 B2
(45) Date of Patent: Sep. 5, 2017

(54) SYSTEM FOR CONTROLLING TORQUE DISTRIBUTION (71) Applicant: Stiliyan Tsonev Ganchev, Varna (BG)

(72) Inventor: Stiliyan Tsonev Ganchev, Varna (BG)

(*) Notice: Subject to any disclaimer, the term of this patent is extended or adjusted under 35 U.S.C. 154(b) by 227 days.

(21) Appl. No.: 14/578,342

(22) Filed: Dec. 20, 2014

(65) Prior Publication Data

US 2016/0176289 A1 Jun. 23, 2016

Related U.S. Application Data

(63) Continuation-in-part of application No. 13/565,610, filed on Aug. 2, 2012, now abandoned, which is a continuation-in-part of application No. 12/280,556, filed as application No. PCT/BG2007/000003 on Feb. 22, 2007, now abandoned.

(30) Foreign Application Priority Data

Feb. 24, 2006 (BG) ........................................ 109454

(51) Int. Cl.
*B60K 17/02* (2006.01)
*B60K 17/344* (2006.01)
*B60K 23/08* (2006.01)
*B60K 17/35* (2006.01)

(52) U.S. Cl.
CPC ............ *B60K 17/02* (2013.01); *B60K 17/344* (2013.01); *B60K 17/35* (2013.01); *B60K 23/0808* (2013.01)

(58) Field of Classification Search
CPC ...... B60K 17/02; B60K 17/344; B60K 17/35; B60K 17/3505; B60K 23/0808; B60K 2023/085; B60K 17/351

USPC ......................................................... 180/247
See application file for complete search history.

(56) References Cited

U.S. PATENT DOCUMENTS 5,740,877 A   4/1998 Sasaki
5,819,194 A  10/1998 Hara et al.
6,056,666 A   5/2000 Williams
(Continued)

FOREIGN PATENT DOCUMENTS

EP   1650072   4/2006
JP  63013824   1/1988
JP   2109733   4/1990

OTHER PUBLICATIONS

International Search Report PCT/BG 2007/000003 related to subject application.

*Primary Examiner* — Joseph Rocca
*Assistant Examiner* — Michael Stabley
(74) *Attorney, Agent, or Firm* — Minder Law Group; Willy H. Wong (57) ABSTRACT

A torque distribution control system comprises a torsion unit for detecting traction on wheels of a primary driving axle that is continuously engaged with a drive source or a source of torque power. The amount of traction detected is converted to a signal with variable signal strength, the signal strength correlating to the amount of traction detected by the torsion unit. The signal strength capable of being adjusted automatically based on select parameters and/or manually based on a driver's input. And, in response to the signal, actuators engage and control operations of the vehicle such as the drive source, a braking system, and/or an axle clutch, with the level of engagement dependent upon the signal strength.

17 Claims, 2 Drawing Sheets

(56) References Cited

U.S. PATENT DOCUMENTS

| | | |
|---|---|---|
| 6,997,299 B2 | 2/2006 | Brissenden et al. |
| 7,104,374 B2 * | 9/2006 | Takashi ................ B60K 17/02 180/65.6 |
| 7,721,834 B2 | 5/2010 | Boctor et al. |
| 8,459,149 B2 * | 6/2013 | Suzuki .................. B60K 17/35 74/665 G |
| 2009/0170651 A1 * | 7/2009 | Ganchev ............ B60K 23/0808 475/223 |
| 2012/0295761 A1 * | 11/2012 | Ganchev ............ B60K 17/3505 477/172 |

* cited by examiner

SYSTEM FOR CONTROLLING TORQUE DISTRIBUTION

RELATED APPLICATIONS

This application is a continuation-in-part application of U.S. patent application Ser. No. 13/565,610, filed Aug. 2, 2012, which is a continuation-in-part application of U.S. patent application Ser. No. 12/280,556, filed Dec. 22, 2008, which is the National Stage of International Application No. PCT/BG2007/000003, filed Feb. 22, 2007, which claims benefit of Bulgarian Patent Application No. 109454, filed Feb. 24, 2006. The above applications are incorporated by reference herein.

FIELD OF INVENTION

The invention relates to a system for controlling torque distribution applicable in mechanical engineering. This torque distribution control system can be used in motor vehicles or in applications requiring the automatic distribution of torque in functionally connected objects.

RELATED ART

An increasing number of motor vehicles incorporate torque distribution control systems to provide greater vehicle stability and increased fuel efficiency. Conventional torque distribution control systems can selectively convert a power transmission system between a two-wheel driving mode and a four-wheel driving mode via one or more clutches. In a motor vehicle, clutches are mechanical devices capable of engaging and disengaging the power transmission to the wheels. For example, a primary clutch can be used to engage and disengage the power source from a primary driving shaft to accommodate gear shifts.

In the simplest application of a torque distribution control system, a secondary axle clutch can be used to connect and disconnect two rotating shafts: a primary driving shaft connected to a motor or other power source generating torque, and a secondary driving shaft (the driven shaft) powering a secondary driving axle (the driven axle).

The primary driving shaft can power a primary driving axle having primary driving wheels. When engaged to the power source, the primary driving shaft continuously powers the primary driving axle and primary driving wheels in the two-wheel driving mode. When the axle clutch connects the secondary driving shaft with the primary driving shaft, the power is further transmitted to the secondary driving axle and secondary driving wheels in the four-wheel driving mode.

A driver can manually switch between the two-wheel driving mode and the four-wheel driving mode by manually engaging and disengaging the axle clutch. In some torque distribution control systems, including automated systems, the torque distribution control system determines whether to engage the axle clutch by considering several factors, including the amount of traction between the wheels and a surface, such as a road. The effectiveness of these torque distribution control systems depends primarily on how quickly the system reacts to changes in these various factors. As mentioned above, conventional torque distribution control systems utilize one primary driving axle, which is continuously engaged to a drive source or a source of torque power when a primary clutch is engaged. When the wheels on the primary driving axle lose traction with the road, the torque distribution control systems automatically engage a secondary driving axle that is not continuously engaged. The selective engagement of the secondary driving axle can be carried out by a multi-disc clutch, which is typically activated by hydraulic or electromagnetic actuators via control signals. These control signals are generated by electronic control equipment.

Under prior art electronic control systems, torque distribution occurs through the following stages: 1) collection and generation of data from sensors; 2) calculation and determination of traction loss; 3) generation of the appropriate control signals to correct the traction loss; 4) transmission of control signals to actuators; and 5) operation of the actuators to activate the axle clutch, which transfers torque to the secondary driving axle. With these prior art systems, loss of traction is calculated indirectly by evaluating data and signals received from sensors and other components of the vehicle. In order to evaluate the data and signals, the sensor data and vehicle information must first be converted into electronic or digital form prior to processing. Only after this conversion is completed can the vehicle then analyze the information to calculate or determine the amount of traction lost.

The data and signals can include fuel injection information (for example, engine speed, suction negative pressure, and suction air amount), transmission information (for example, shift position, and torque ratio), and anti-lock braking system (ABS) information (for example, vehicle speed, and brake signal). These sensor data and vehicle information do not directly detect loss of traction. Therefore, calculation and determination of traction loss is done after loss of traction has already occurred, thereby adversely affecting cruising stability of the vehicle, especially while driving on turns and on low traction surfaces like gravel and wet pavement.

As detailed above, a major disadvantage of these prior art torque distribution control systems is the delay caused by the reliance on the indirect determination of traction loss. These systems typically use discrepancies between the rotational speeds of the wheels to calculate loss of traction. However, the detection of such discrepancies by the ABS sensors represents a delayed detection of traction loss. Another disadvantage of electronically controlled torque distribution systems is the complete absence of quantitative data regarding the magnitude of the lost traction. An accurate reading on the loss of traction is required to effectively determine what corrective measures should taken to correct the traction loss.

SUMMARY OF THE INVENTION

Accordingly, it is an object of the invention to create a torsion system for controlling torque distribution.

It is a further object of the invention to directly detect changes in the traction between the wheels of the continuously engaged primary driving axle and the road, thereby ensuring an accurate quantitative assessment of traction.

It is a further object of the invention to minimize the delay between detection of traction loss and the execution of corrective measures to correct the traction loss.

It is a further object of the invention to provide a system for controlling torque distribution that utilizes a quantitative assessment of traction to determine appropriate corrective measures to correct the traction loss.

It is a further object of the invention to provide a system for controlling torque distribution that improves cruising stability of a vehicle.

It is a further object of the invention to provide a torque distribution control system that is capable of controlling torque distribution without relying on sensor data.

It is a further object of the invention to provide a torque distribution control system that is capable of controlling torque distribution without first performing calculations on sensor data.

It is a further object of the invention to provide a simple, efficient, durable, and cost effective torque distribution control system.

According to one aspect of the present invention, these and other objects are attained by a torque distribution control system, comprising:

means for detecting traction on wheels of a primary driving axle that is continuously engaged with a drive source or a source of torque power;

means for converting the amount of traction detected to a signal with a variable signal strength, the signal strength correlating to the amount of traction detected by the detection means;

means for adjusting the signal strength, said adjustment means making signal strength adjustments automatically based on select parameters and/or manually based on a driver's input; and in response to the signal, means for engaging mechanisms and other systems, with the level of engagement dependent upon the signal strength.

In one embodiment of the present invention, traction between the road and the wheels of the continuously engaged driving axle is directly detected and is utilized during the process of torque distribution by torsional devices integrated into the drive shafts. These torsional devices comprise, in part, of elastic elements that are sensitive to torsional load forces, and the torsional devices are constructed as mechanical units having relative mobility. Mechanical relative displacements between the components of these units are effected by applying torque to the drive shafts, which causes changes in the state of the elastic element (for example, displacements are carried out simultaneously with and proportional to the deformation and recovery of the elastic elements).

Acting torque forces are proportional to the traction experienced and to the torsional load forces applied on the elastic elements. Thus, the mechanical displacements in the converter unit are proportional to the traction gain or loss experienced (respective to the applied torques) and are carried out simultaneously with the changes in their values. A mechanical unit, which is connected to the converter unit, converts the mechanical displacements into physical actions. These actions are proportionately applied to clutches, brakes, or other torque distribution devices, without the need for any preliminary calculations on data relating to motion parameters. Additional devices can be implemented for proportioning or adjusting the physical actions to change the extent or magnitude of the actions.

The invention provides simple technical means for utilizing torsion deformations in controlling the distribution of driving and brake torques. These deformations contain torsion information, which accurately, directly, and continuously reflects the gain or loss of traction.

DESCRIPTION OF THE PREFERRED EMBODIMENTS

Referring to the drawings, a description will be made with regards to preferred embodiments of a torque distribution control system according to the present invention. As detailed below, the present invention is capable of controlling torque distribution without first collecting or generating data from sensors and without first performing calculations on sensor data. When there are changes in traction between a vehicle's primary driving wheels and a surface (such as on a road or on gravel), the present invention is capable of automatically controlling torque distribution by engaging and disengaging secondary driving wheels simultaneous with the changes in traction.

Figure 1:
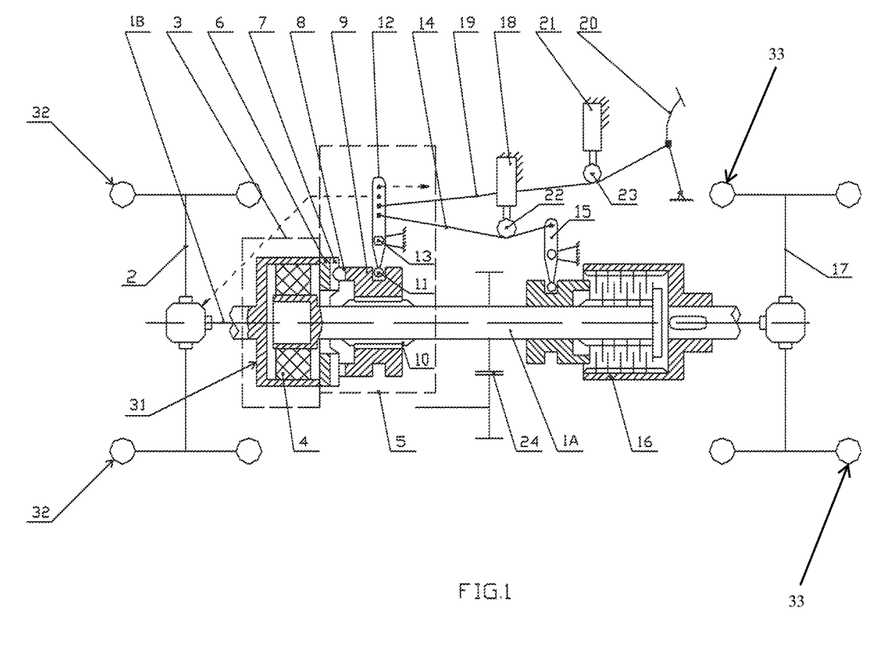
FIG. 1 is a schematic system diagram illustrating a first preferred embodiment of the present invention.

FIG. 1 shows a first preferred embodiment of the present invention. A drive source 24, which can include a transmission and an engine (not shown), generates torque. The drive source 24 transfers the torque to a first shaft portion 1A when a primary clutch (not shown) is engaged, and conversely ceases to transfer torque when the primary clutch is disengaged. The torque causes the first shaft portion 1A to rotate about its longitudinal axis.

In a torsion unit 3, deformable elastic elements 4 connect the first shaft portion 1A to a housing 31 located at a housing end of a second shaft portion 1B, such that second shaft portion 1B is not directly attached to first shaft portion 1A. The elastic elements 4 allows first shaft portion 1A to be angularly displaced relative to second shaft portion 1B when torsion is applied to the elastic elements 4. Torsion can be applied to the elastic elements 4 when torsional loads are placed on first shaft portion 1A and second shaft portion 1B. These torsional loads exert torsional load forces onto the elastic elements 4, causing the elastic elements 4 to twist and deform. The greater the difference between the magnitude of the torsional load force from first shaft portion 1A and the magnitude of the torsional load force from second shaft portion 1B, the higher level of torsion is experienced by the elastic elements 4. The increase in torsion is proportional to the increasing difference between the magnitudes of the torsional load forces, which in turn is proportional to the increase in traction between the wheels and the surface. As the difference between the torsional load force magnitudes decreases, the level of torsion experienced by the elastic elements 4 also proportionally decreases relative to the decrease in the difference, which is also proportional to the traction loss experienced by the wheels.

An axle end of second shaft portion 1B opposite to the housing end is mechanically connected to a primary driving axle 2 that is continuously engaged to the drive source 24. Rotably mounted primary driving wheels 32 are equipped on the primary driving axle 2. As the first shaft portion 1A rotates, torque is transferred to the second shaft portion 1B through the elastic elements 4. The torque powers the primary driving axle 2, causing the primary driving wheels 32 to spin.

When the primary driving wheels 32 have no traction with the road, it provides little or negligible resistance to the torque generated by the drive source 24, so there is no deformation of the elastic elements 4 and no angular displacement of second shaft portion 1B relative to first shaft portion 1A. When the primary driving wheels 32 have traction with the road, the traction builds resistance to the torque and acts as a torsional load on the elastic elements 4.

This resistance causes the elastic elements 4 to twist and deform, which results in angular displacement of the second shaft portion 1B relative to the first shaft portion 1A. Optional sensors (not shown) can be applied to the elastic elements 4, the torsion unit 3, and/or the shaft portions 1A and 1B to obtain torsion data or a quantitative reading of the torsion experienced by the elastic elements 4. While data from sensors, external sources, or other systems can be optionally used to adjust the control signals or the various systems of the vehicle, the data is not needed to operate the torque distribution control system.

Attached to the housing 31 is a converter unit 5, comprising a hollow rotary component 6, a disk 9, and a control lever 12, which is suspended on a stationary pivot 13. The converter unit 5 is attached to torsion unit 3 via the rotary component 6. Dimples 7 cut into the rotary component 6 are capable of interacting with round ends of stems 8 protruding from the disk 9, which is connected to the first shaft portion 1A by a spline joint 10. The disk 9 is also connected by a hinge 11 to a hinge end of the control lever 12.

On an actuator end of the control lever 12 opposite of the hinge end, the control lever 12 is connected to actuators used for automatically and mechanically controlling the operation of the mechanisms and systems of the vehicle, including a clutch line 14 and a brake line 19. As represented by the dotted lines, the control lever 12 can control other systems of the vehicle, for example the engine and the transmission.

In this embodiment of the invention, the control lever 12 generates a clutch control signal of variable strength using the clutch line 14. Although this clutch control signal is mechanical in nature, it can be converted to other signals (for example, electric or hydraulic signals) in other embodiments of the invention. Via the clutch control signal, the control lever 12 is capable of automatically and mechanically controlling at least one axle clutch 16 servicing a secondary driving axle 17.

Unlike the primary driving axle 2, the secondary driving axle 17 is not continuously engaged to the drive source 24. The control lever 12 transmits the clutch control signal through the clutch line 14 (or a similar mechanical or wire component) to the engagement device 15, which is capable of then automatically and mechanically activating or deactivating the axle clutch 16. The signal strength depends on the input provided by converter unit 5 and can be adjusted by a clutch adjuster 18 (via a clutch adjuster roller 22), which can make adjustments to the signal strength manually based on a driver's input or automatically based on relevant parameters such as engine mode and turning angle. In this embodiment of the invention, no collection or calculation of electronic or sensor data is necessary for the torque distribution system to engage the axle clutch 16. As such, the mechanical clutch control signal is not affected by any sensor data or traction loss data collected electronically.

As changes in traction occur on the primary driving wheels 32, the present torque distribution system automatically and mechanically engages and disengages the axle clutch 16 concurrently with and proportional to the changes in traction, thereby providing torque to the secondary driving axle 17 and secondary driving wheels 33 proportional to the torque generated by the drive source 24.

The control lever 12 is also capable of automatically and mechanically controlling a braking system 20 via a brake control signal of variable strength. Similar to the clutch control signal, the brake control signal used in this embodiment is mechanical (by way of brake line 19 or a similar mechanical or wire component), but other embodiments of the invention can use electric, hydraulic, or other control signals. The control lever 12 automatically and mechanically transmits the brake control signal through the brake line 19, which is capable of then activating or deactivating the braking system 20. The signal strength depends on the input provided by converter unit 5 and can be adjusted by a brake adjuster 21 (via a brake adjuster roller 23), which can make adjustments to the signal strength manually based on a driver's input or automatically based on relevant parameters such as engine mode and turning angle.

In this embodiment of the invention, no collection or calculation of electronic or sensor data is necessary for the present invention to engage the braking system 20. As such, the mechanical brake control signal is not affected by any sensor data or traction loss data collected electronically.

When the primary driving wheels 32 gain traction with a road or other surface, the traction acts as a torsional load and the resultant torsional load forces cause the elastic elements 4 to experience torsion due to the traction's resistance to the torque generated by the drive source 24. The amount of torsion experienced is proportional to the traction's resistance to the torque generated. This causes angular displacement of the second shaft portion 1B and the rotary component 6 relative to the first shaft portion 1A and the disk 9. This discrepancy in angular displacement forces the round ends of stems 8 out of the dimples 7, causing disk 9 to slide away from torsion unit 3 along first shaft portion 1A, which causes the control lever 12 to rotate counterclockwise about the pivot 13. In this embodiment of the invention, the pivot 13 remains immobile relative to the chassis of the vehicle.

As the control lever 12 rotates, it generates a mechanical control signal of a signal strength proportional to the rotation, which in turn is proportional to the amount of torsion experienced due to the traction gain. The mechanical control signal causes the engagement device 15 to automatically disengage from the axle clutch 16, thereby deactivating the axle clutch 16 when the primary wheels 32 reach a predetermined threshold traction with the road. Accordingly, the torque distribution system is capable of reacting immediately to changes in the traction of the primary driving wheels 32, rather than experiencing delays created by the collection of sensor data and by the calculation of traction loss using the sensor data. When the axle clutch 16 is deactivated, it is automatically disengaged from the drive source 24, thus allowing secondary driving wheels 33 to rotate freely and independently from the drive source 24 and the primary driving wheels 32.

Conversely, when the primary driving wheels 32 lose traction, the primary driving wheels 32 provide little or negligible resistance to the torque generated by the drive source 24. This results in no angular displacement of the second shaft portion 1B and the rotary component 6 relative to the first shaft portion 1A and the disk 9. The lack of angular displacement keeps the round ends of stems 8 within the dimples 7, causing disk 9 to slide towards the torsion unit 3 along first shaft portion 1A, which causes the control lever 12 to rotate clockwise about pivot 13.

As the control lever 12 rotates, it generates a mechanical control signal of a signal strength proportional to the rotation, which in turn is proportional to the amount of torsion lost due to the loss of traction. The mechanical control signal causes the engagement device 15 to automatically engage with the axle clutch 16, thereby activating the axle clutch 16 when the primary driving wheels 32 have no traction with the road, or if the traction decreases below a predetermined threshold. When the axle clutch 16 is activated, it is automatically engaged with the drive source 24, causing the secondary driving wheels 33 to rotate proportionally to the drive source 24 and the primary driving wheels 32. As stated above, the torque distribution system is capable of reacting immediately to changes in the traction of the primary driving wheels 32, rather than experiencing delays created by the collection of sensor data and by the calculation of traction loss using the sensor data.

When torque is not exerted on torsion unit 3 (in other words, when there is no deformation of elastic elements 4), the position of rollers 22 and 23 determine the three general states of clutch line 14, brake line 19, or communication lines for other components of the vehicle. When only the roller keeps the line taut, the state is defined as "zero tension" of the line. In that state, the roller does not exert corrective influence on the controlling impacts. Where the roller tightens the line so that it engages (partially or completely) the clutch 16 or the brake 20, this state is defined as "positive tension". Through positive tension of the line, a certain degree of engagement with the clutch 16 or the brake 20 is achieved, whereupon various engine torque bias ratios between the driving axles are set. In situations where a roller slackens a line, the state is defines as "negative tension". Depending on the degree of slackening, the controlling impact can be delayed, weakened, or interrupted.

The definite bias ratio of engine torque distribution between the driving can be manually or automatically set according to various determining factors. For example, the settings can take into account the type of vehicle, the particular road conditions, the operating processes of the ABS and other safety systems, or the driving style preferred by the driver. Such settings can adjust the movement of rollers 22 and 23. This movement of the rollers 22 and 23 can commensurate with the clutch stroke.

Elastic elements 4 deform when there is traction between the road and the primary driving wheels 32 on the permanently engaged primary driving axle 2. Where there is zero tension of clutch line 14, the lack of deformation of the elastic elements 4 corresponds to a fully engaged clutch 16 that fully engages secondary driving axle 17. Conversely, maximum deformation of elastic elements 4 corresponds to a fully disengaged clutch 16 and a fully disengaged secondary driving axle 17. Preferably, the elastic characteristics of the elastic elements 4 and the characteristics of torsion unit 3 are chosen so that maximum deformation of elastic elements 4 and the full disengagement of the secondary driving axle 17 occurs upon sufficiently high values of traction and vehicle stability.

When driving with only the permanently engaged primary driving axle 2 engaged with the drive source 24, each drop down or loss of traction below certain predetermined or manually set values will result in immediate engagement of the secondary driving axle 17. In case of zero tension, engagement of the secondary driving axle 17 will also occur for each drop down or decrease of the engine torque (for example, when the vehicle is decelerating) below the values upon which the elastic elements 4 experience maximum deformation (for example, when driving on a road with good traction).

Brake line 19 and brake adjuster 21 can assist the vehicle when ascending and descending a slope. In addition, brake line 19 and brake adjuster 21 can also serve as an automatic parking brake. To perform these functions while the vehicle is stopped, brake pedal 20 should be pressed or activated and brake line 19 should be set to zero tension or slightly positive tension by brake adjuster 21, either manually or automatically. With these settings, the brake remains engaged even after release of the brake pedal 20. The brake acts upon all of the wheels and is automatically released after engine torque is transferred to shaft 1. After reaching a certain speed, brake line 19 should be loosened. After starting, if the operation of brake adjuster 21 is not manually or automatically terminated, the brakes can activate upon each release of the accelerator.

Other embodiments of the invention utilize variations of the torsion unit 3 and converter unit 5. For example, the interaction between the torsion unit 3 and converter unit 5 is not limited to the engagement and disengagement of the stems 8 and dimples 7. In some embodiments of the invention, torsional loads causing angular displacement can conversely force the round ends of stems 8 into (rather than out of) the dimples 7. In addition, cammed profiles are used in place of dimples 7 in other embodiments of the invention. Those skilled in the art will recognize that there are multiple ways of using the amount of traction from the primary driving wheels 32 to effect the interaction between the torsion unit 3 and converter unit 5.

Figure 2:
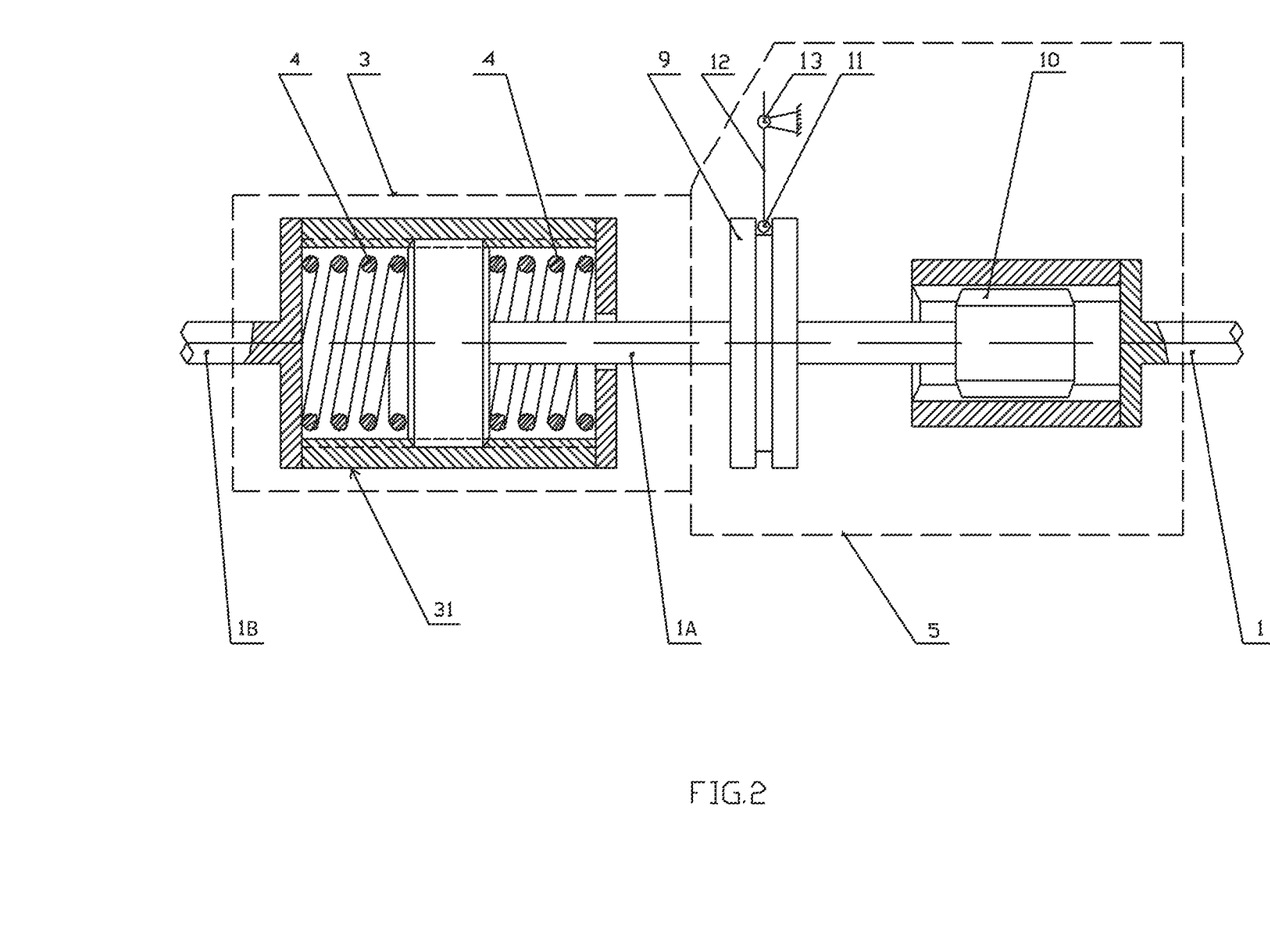
FIG. 2 is a schematic system diagram illustrating a second preferred embodiment of the present invention.

FIG. 2 shows a second preferred embodiment of the present invention. Reference numbers in FIG. 2 relating to elements in the second preferred embodiment correspond to the reference numbers in FIG. 1 for like elements in the first preferred embodiment.

In this second preferred embodiment, a first shaft portion 1A is bookended by spline joints 10 and screw couplings at both ends. Along with elastic elements 4, one of the spline joints 10 and one of the screw couplings are enclosed in a housing 31 at one end of second shaft portion 1B, thereby forming torsion unit 3. As shown in FIG. 2, helical springs can be used for elastic elements 4 to detect rotational resistance. The second shaft portion 1B is mechanically connected to a continuously engaged primary driving axle (not shown) equipped with rotatably mounted primary driving wheels (not shown).

As in the first preferred embodiment, the primary driving wheels are powered by the transfer of torque from a drive source (not shown) via the first shaft portion 1A, the elastic elements 4, and the second shaft portion 1B. When primary driving wheels have no traction with the road, it provides little or negligible resistance to the torque generated by the drive source, so there is no deformation of the elastic elements 4 and no angular displacement of the second shaft portion 1B towards the first shaft portion 1A.

However, when the primary driving wheels have traction with the road, the traction builds resistance to the torque and acts as a torsional load, with the torsional load forces causing elastic elements 4 to twist and deform. This forces the first shaft portion 1A to slide along the spline joints 10. A disk 9 attached to the first shaft portion 1A also slides in the same direction as the first shaft portion 1A, causing a control lever 12 to trigger the signal process described above in the first preferred embodiment.

A third preferred embodiment of the present invention is a variant of the second preferred embodiment of the present invention. The third preferred embodiment instead uses a disk 9 made with a cammed profile, which extends along the length of the shaft 1 in such a way that the control lever 12 follows the cammed profile by means of slide couplings.

A fourth preferred embodiment of the present invention is a variant of the first preferred embodiment of the present invention. In this preferred embodiment, the torque is exerted with inclined cogs onto shaft 1 through disk 9. In that variant, the elastic elements 4 can be placed on both sides of disk 9, and the gear pair will perform a function similar to that of the screw coupling in FIG. 2.

While the above preferred embodiments utilize exemplary mechanical structures to illustrate the mechanisms of the present invention, one skilled in the art will be able to appreciate that prior art devices can be used as alternatives to the mechanical structures. For example, hydraulic, electric, or other mechanical signal mechanisms and actuators can be used to generate, transmit, and adjust the signals that control the axle clutch. Similarly, the components in the torsion unit can be replaced by other means of gathering and evaluating the torsion data, such as magnetic and photoelectric sensors. Another variant of the present invention blends hydraulics with the mechanical features of the preferred embodiments. This would require that the housing of the torsion unit to be watertight, thereby encasing and submerging the elastic elements in a fluid-filled enclosure.

In addition, one skilled in the art will be able to appreciate that the torsion unit and the converter unit can be positioned on other parts of the torque distribution system as well. For example, the torsion unit can be positioned to retrieve torsion information on any portion of the shafts or axles of the vehicle, such as the driving shafts, the semi-shafts of the driving axles, or on the shaft before the transmission mechanism. This setup provides control over additional clutches such as those used in systems that distribute torque to each wheel independently. The torsion unit and the converter unit can also be positioned before the transmission. Similarly, other configurations of the system can be used to accommodate other components of the vehicle, such as the differential.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

LIST OF REFERENCE NUMERALS 1A first shaft portion
1B second shaft portion
2 primary driving axle
3 torsion unit
4 elastic elements
5 converter unit
6 rotary component
7 dimples
8 round ends of stems
9 disk
10 spline joint
11 hinge
12 control lever
13 pivot
14 clutch line
15 engagement device
16 axle clutch
17 secondary driving axle
18 clutch adjuster
19 brake line
20 braking system
21 brake adjuster
22 clutch adjuster roller
23 brake adjuster roller
24 drive source
31 housing
32 primary driving wheels
33 secondary driving wheels

What is claimed is:

1. A system for controlling torque distribution, comprising:
a shaft powered by a drive source, the shaft separated into a first shaft portion and a second shaft portion;
a torsion unit having an elastic element connecting the first shaft portion to the second shaft portion;
a primary driving axle that is mechanically connected to the shaft and is continuously engaged by the drive source;
a secondary driving axle not continuously engaged by the drive source;
an axle clutch capable of engaging and disengaging the secondary driving axle; and
at least one actuator capable of controlling operation of the drive source, a braking system, and/or the axle clutch;
wherein the elastic element of the torsion unit deforms during transfer of drive torque from the first shaft portion to the second shaft portion;
wherein a deformation of the elastic element and a disengagement of the secondary driving axle by the axle clutch are executed without first performing calculations on sensor data; and
wherein any changes in traction on the primary driving axle will readjust torque distribution to the secondary driving axle without first performing calculations on sensor data.

2. A system as claimed in claim 1, further comprising:
a housing of the torsion unit partially or fully enclosing the elastic element;
a hollow rotary component of a converter unit attached to the housing, the hollow rotary component having at least one dimple;
a disk of the converter unit with at least one protruding stem having a rounded end, the disk attached to the shaft by a spline joint; and
a control lever of the converter unit suspended on a stationary pivot, the control lever connected to an engagement device on one side of the pivot and connected to the disk on the other side of the pivot;
wherein the dimple is capable of interacting with the protruding stem.

3. A system as claimed in claim 2, further comprising:
a clutch line with an engagement device at one end and connected to the control lever at the other end; and
a clutch adjuster installed on the clutch line;
wherein the control lever is capable of controlling the axle clutch through the clutch line and the engagement device.

4. A system as claimed in claim 2, further comprising:
a brake line connected to the control lever at one end and to the braking system at the other end; and
a brake adjuster installed on the brake line.

5. A system for controlling torque distribution, comprising:
a shaft rotatable by a drive source, the shaft separated into a first shaft portion and a second shaft portion;
a torsion unit having an elastic element capable of experiencing torsion;
a primary driving axle that is connected to the torsion unit and is continuously engaged by the drive source;
a secondary driving axle not continuously engaged by the drive source;
an axle clutch capable of engaging and disengaging the secondary driving axle; and a converter unit capable of controlling operation of the drive source, a transmission, a braking system, and/or the axle clutch, the converter unit capable of converting angular displacement of the first shaft portion relative to the second shaft portion into physical action for controlling torque distribution; and wherein torque distribution is adjusted, without first performing calculations on sensor data, between the primary driving axle and the secondary driving axle depending on changes in the torsion experienced by the elastic element.

6. A system as claimed in claim 5, wherein the angular displacement increases as the torsion increases; and wherein adjustments in torque distribution is not affected by any sensor data collected electronically.

7. A system as claimed in claim 6, wherein the axle clutch will engage the secondary driving axle if the angular displacement falls below a threshold.

8. A system as claimed in claim 5, further comprising:
a housing partially or completely enclosing the elastic element;
a rotary component attached to the housing, the rotary component having at least one dimple; and
a disk connected to the shaft with a spline joint, the disk having at least one protrusion with a rounded end, the rounded end being capable of interacting with the dimple;
wherein the rounded end interacts with the dimple depending on changes in the torsion exerted on the elastic element, and the disk slides along the spline joint depending on angular displacement of the rounded end relative to the dimple.

9. A system as claimed in claim 8, wherein the torsion causes the elastic element to deform, which causes angular displacement of the first shaft portion relative to the second shaft portion, forcing the rounded end out of the dimple.

10. A system as claimed in claim 8, wherein a control lever is suspended about a pivot, the control lever connected to the disk on one side of the pivot, the control lever connected to at least one engagement device on the other side of the pivot.

11. A system as claimed in claim 5, further comprising:
a housing partially or completely enclosing the elastic element;
two spline joints, one on each end of the first shaft portion, with one of the spline joints connected to the housing; and
a disk rotatably mounted on the first shaft portion between the two spline joints.

12. A system as claimed in claim 11, wherein the elastic element is a spring.

13. A system as claimed in claim 5, further comprising:
a hinge of the converter unit;
a control lever of the converter unit suspended on a stationary pivot, the control lever connected to a clutch line on one side of the pivot and connected to the hinge on the other side of the pivot, the clutch line connected to an engagement device at one end and connected to the control lever at the other end; and
a clutch adjuster installed on the clutch line;
wherein the control lever is capable of controlling the axle clutch through the clutch line and the engagement device.

14. A system as claimed in claim 13, wherein when the control lever rotates about the pivot proportionally to changes in traction experienced by the primary driving axle.

15. A system as claimed in claim 14, wherein the axle clutch engages and disengages the secondary driving axle when the control lever rotates across certain thresholds.

16. A system as claimed in claim 13, further comprising:
a rotary component of the converter unit; and
a disk of the converter unit;
wherein an increase in traction experienced by the primary driving axle causes an increase in torsion experienced by the elastic element proportional to the increase in traction;
wherein the increase in torsion causes an increase in angular displacement of the first shaft portion relative to the second shaft portion proportional to the increase in traction;
wherein the increase in torsion also causes an increase in angular displacement of the rotary component relative to the disk proportional to the increase in torsion;
wherein the increase in angular displacement of the rotary component relative to the disk causes a forward rotation by the control lever proportional to the increase in angular displacement;
wherein the forward rotation causes a decrease in engagement of the secondary driving axle by the axle clutch, the decrease in engagement of the secondary driving axle being proportional to the forward rotation;
wherein a decrease in traction experienced by the primary driving axle causes a decrease in torsion experienced by the elastic element proportional to the decrease in traction;
wherein the decrease in torsion causes a decrease in angular displacement of the first shaft portion relative to the second shaft portion proportional to the decrease in traction;
wherein the decrease in torsion also causes a decrease in angular displacement of the rotary component relative to the disk proportional to the decrease in torsion;
wherein the decrease in angular displacement of the rotary component relative to the disk causes a backward rotation by the control lever proportional to the decrease in angular displacement; and
wherein the backward rotation causes an increase in engagement of the secondary driving axle by the axle clutch, the increase in engagement of the secondary driving axle being proportional to the backward rotation.

17. A system as claimed in claim 13, further comprising:
a rotary component of the converter unit; and
a disk of the converter unit;
wherein an increase in traction experienced by the primary driving axle automatically causes an increase in torsion experienced by the elastic element;
wherein the increase in torsion automatically causes an increase in angular displacement of the first shaft portion relative to the second shaft portion;
wherein the increase in torsion also automatically causes an increase in angular displacement of the rotary component relative to the disk;
wherein the increase in angular displacement of the rotary component relative to the disk automatically causes a forward rotation by the control lever;
wherein the forward rotation automatically causes a decrease in engagement of the secondary driving axle by the axle clutch;
wherein a decrease in traction experienced by the primary driving axle automatically causes a decrease in torsion experienced by the elastic element;

wherein the decrease in torsion automatically causes a decrease in angular displacement of the first shaft portion relative to the second shaft portion;

wherein the decrease in torsion also automatically causes a decrease in angular displacement of the rotary component relative to the disk;

wherein the decrease in angular displacement of the rotary component relative to the disk automatically causes a backward rotation by the control lever; and wherein the backward rotation automatically causes an increase in engagement of the secondary driving axle by the axle clutch.

* * * * *